3,086,992
PRODUCTION OF TRIMELLITIC ACID
Peter Stanley Backlund, Anaheim, Calif., assignor to Union Oil Company of California, Los Angeles, Calif., a corporation of California
No Drawing. Filed Nov. 21, 1958, Ser. No. 775,389
1 Claim. (Cl. 260—524)

This invention relates to the production of trimellitic acid, and in particular concerns an improved process for producing said acid by the nitric acid oxidation of pseudocumene.

The formation of benzene carboxylic acids by oxidation of the corresponding alkylbenzenes with nitric acid is well known. Thus, benzoic acid is readily obtained by reacting toluene with nitric acid, and phthalic acids are similarly prepared from the xylenes. In all of such reactions, however, a nitration reaction proceeds in competition with the desired oxidation reaction so that the reaction product contains appreciable amounts of undesired nitration products. As the number of alkyl groups of the alkylbenzene is increased, more stringent reaction conditions, e.g., reaction temperature, amount of nitric acid employed, etc., are required to convert the alkyl groups to carboxyl groups. Unfortunately, such more stringent conditions likewise favor nitration. Consequently, the nitric acid oxidation of polyalkylbenzenes as heretofore practiced is characterized by relatively low yields of the desired polycarboxylic acids and relatively high yields of undesirable nitration products. To some extent this can be alleviated by employing the nitric acid in relatively dilute form, but such procedure introduces into the system large amounts of water which increase the heat requirements of the process.

The present invention is based on my discovery that in the oxidation of pseudocumene with nitric acid to produce trimellitic acid, the aforementioned difficulties can be overcome to a considerable extent by carrying out the reaction in two distinct stages employing nitric acid of different concentrations. More particularly, I have found that pseudocumene can advantageously be oxidized to trimellitic acid by reacting the pseudocumene at elevated temperatures and pressures with relatively dilute aqueous nitric acid and thereafter completing the oxidation with relatively concentrated aqueous nitric acid at the same or slightly more elevated temperature.

Considering now the process of the invention in greater detail, the initial step thereof consists in reacting pseudocumene with aqueous nitric acid of between about 5 and about 20 percent by weight concentration at a temperature between about 150° C. and about 250° C., preferably between about 180° C. and about 200° C. Use of reaction temperatures below about 150° C. leads to the formation of only partially oxidized products, e.g., methyl phthalic acids, whereas operation at temperatures above about 250° C. results in the formation of large quantities of nitration products. The reaction is carried out in the liquid phase; accordingly, the pressure is at least equal to the vapor pressure of the reaction mixture at the reaction temperature employed, and may be considerably higher, e.g., 1000 p.s.i.g. or higher. Between about 1.25 and about 2.4, preferably about 1.9, moles of nitric acid (water-free basis) are provided per mole of pseudocumene. Ordinarily, the reaction is conveniently carried out simply by charging the pseudocumene to a suitable pressure vessel, adding the dilute nitric acid, and then heating the reaction mixture to the desired reaction temperature. If reaction pressures higher than autogenic are to be employed, the vessel is pressured up with air, nitrogen or other inert gas. An inert reaction solvent, such as carbon tetrachloride, may be employed if desired. According to an alternative mode of procedure, the pseudocumene reactant is heated to the desired reaction temperature in a closed pressure vessel, and the dilute nitric acid is introduced under pressure into the reaction vessel at a rate approximately the same as that of its consumption in the reaction.

Upon completion of the initial reaction step, which usually requires between about 0.25 and about 0.5 hour, depending upon the reaction temperature, the reaction mixture is subjected directly and without intermediate purification to the second step of the process.

In the second reaction step, the first step reaction product is reacted with aqueous nitric acid of between about 50 and about 100 percent by weight concentration. The reaction is carried out at a temperature between about 150° C. and about 250° C., and the reaction pressure is at least equal to the autogenic pressure of the system at the particular temperature employed. Again, operation outside this temperature range results in the formation either of only partially oxidized products or large amounts of nitration products. If desired, the transition from the first to the second reaction step may be made simply by introducing the concentrated nitric acid into the reaction vessel without effecting any change in temperature. Preferably, however, the second step reaction temperature is slightly higher than that employed in the first step. Thus, if the first step is carried out at, say, about 180° C., it is preferred to carry out the second step at about 200° C. In general, it is preferred to carry out the first reaction step at a temperature between about 180° C. to about 200° C., and to carry out the second reaction step at a temperature between about 200° C. and about 220° C. The amount of nitric acid employed in the second step is equivalent to between about 3.0 and about 4.5 moles per mole of the pseudocumene reactant, depending upon the mole ratio employed in the first step. The overall mole ratio of nitric acid to pseudocumene should be held between about 5 and about 6, with between about 25 and about 40 percent of the total quantity of acid being employed in the first step and between about 75 and about 60 percent in the second stage.

Upon completion of the second reaction step, which usually requires between about 0.25 and about 0.5 hour, the pressure is released and the reaction product is cooled and treated to recover the trimellitic acid product in the conventional manner. Usually, part of the water and excess nitric acid is flashed off by venting the reaction vessel, e.g., at a temperature above about 100° C., after which the product is cooled to about 60°–100° C., and is filtered to remove any incompletely oxidized products, such as methyl phthalic acid. The mother liquor is then evaporated, and the trimellitic acid is recovered by crystallization. If desired, the acid may be further purified by dissolving it in aqueous sodium hydroxide, filtering the aqueous solution, and converting the sodium salt base to the free acid by treatment with a mineral acid.

The following examples will illustrate several ways in which the principle of the invention may be applied, but are not to be construed as limiting the invention.

Example I

One molecular equivalent of pseudocumene and two molecular equivalents of nitric acid in the form of a 14% aqueous solution are placed in a rocking bomb and heated to a temperature of about 150° C. for about 0.5 hour under an autogenic pressure of about 500 p.s.i.g. The bomb and contents are then cooled, and four molecular equivalents of nitric acid in the form of a 70% aqueous solution are introduced. The temperature is then raised to about 200° C. and held there for about 0.5 hour, after which a part of the water and excess nitric acid is flashed off by venting to the atmosphere. No water-insoluble acids are precipitated upon cooling the reaction product to about 90° C. The product is then heated to evaporate off the majority of the water, and is cooled to allow the trimellitic acid to crystallize. The yield of the latter is about 84.2 mole percent, and the crude acid contains about 9.9 percent nitration products. The amount of water introduced into the reaction system corresponds to about 7.8 pounds per pound of trimellitic acid produced.

In a comparative experiment, the reaction is carried out in a single step, employing 15% nitric acid in the same mole ratio of 6/1. The yield of trimellitic acid is about 85%, but carrying out the reaction in this manner requires that about 21.5 pounds of water be introduced into the system per pound of trimellitic acid produced. When the reaction is carried out in a single stage employing an equivalent amount of 70% nitric acid, the yield of trimellitic acid is less than 30 mole percent.

*Example II*

The procedure of Example I is followed except for the following changes: (1) the first reaction step is carried out at 200° C. for 0.5 hour, and (2) immediately after the first reaction step the 70% nitric acid is pressured into the vessel without substantial reduction of the temperature or pressure. The yield of trimellitic acid is slightly lower (80.3 mole percent) than that attained in Example I, but this is offset by better heat economy.

While the process has been described above in terms of batch-wise operation, it will be apparent that it may also be carried out continuously. Thus, a mixture of pseudocumene and dilute nitric acid may be pumped continuously through a pipe coil reactor mounted in a heating bath, with the more concentrated nitric acid being introduced into the reactor at a suitable point intermediate along the length thereof.

Other modes of applying the principle of my invention may be employed instead of those explained, change being made as regards the methods or materials employed, provided the step or steps stated by the following claim, or the equivalent of such stated step or steps, be employed.

I, therefore, particularly point out and distinctly claim as my invention:

The process for preparing trimellitic acid which comprises (1) heating pseudocumene with dilute nitric acid of between about 5 and about 25 percent by weight concentration at a temperature between about 180° C. and about 200° C. under autogenic pressure for a period of time between about 0.25 and 0.5 hour, said dilute nitric acid being employed in amount corresponding to between 1.25 and about 4 moles of anhydrous nitric acid per mole of pseudocumene; (2) thereafter and without substantially reducing the temperature and pressure and without the addition of a further amount of pseudocumene admixing more concentrated nitric acid of between about 50 and 100 percent by weight concentration with the reaction product so obtained, said more concentrated nitric acid being employed in an amount corresponding to between about 3 and about 4.5 moles per mole of said pseudocumene; (3) heating the resulting mixture at a temperature between about 200° C. and about 220° C. under autogenic pressure for a period of time between about 0.25 and 0.5 hour; (4) flashing water vapor and excess nitric acid from the reaction product by releasing the pressure thereon; (5) cooling the reaction product to a temperature between about 60° C. and about 100° C.; (6) removing any solid products which are present; (7) and crystallizing trimellitic acid from the liquid product.

References Cited in the file of this patent
UNITED STATES PATENTS 2,766,280     Zienty et al.             Oct. 9, 1956

FOREIGN PATENTS 758,676     Great Britain           Oct. 10, 1956

OTHER REFERENCES

Nazarov et al.: Chem. Absts., vol. 50, column 251 (1956). (Copy in Library.)